(12) United States Patent
Gebauer et al.

(10) Patent No.: US 9,546,285 B2
(45) Date of Patent: Jan. 17, 2017

(54) POLYURETHANE COATING COMPOSITION, MULTILAYER SURFACE COATINGS HAVING A MATT SURFACE PRODUCED THEREFROM AND PROCESSES FOR PRODUCING THE MULTILAYER SURFACE COATINGS

(75) Inventors: Beate Gebauer, Münster (DE); Julia Melzer, Münster (DE); Christian Weiher, Münster (DE); Andreas Janssen, Steinfurt (DE); Holger Krumm, Krefeld (DE)

(73) Assignee: BASF Coatings GmbH, Munster (DE)

( * ) Notice: Subject to any disclaimer, the term of this patent is extended or adjusted under 35 U.S.C. 154(b) by 113 days.

(21) Appl. No.: 13/988,440

(22) PCT Filed: Oct. 28, 2011

(86) PCT No.: PCT/EP2011/068958
§ 371 (c)(1),
(2), (4) Date: Nov. 6, 2013

(87) PCT Pub. No.: WO2012/065828
PCT Pub. Date: May 24, 2012

(65) Prior Publication Data
US 2014/0050928 A1    Feb. 20, 2014

Related U.S. Application Data

(60) Provisional application No. 61/414,959, filed on Nov. 18, 2010.

(30) Foreign Application Priority Data

Nov. 18, 2010  (EP) .................................... 10191682

(51) Int. Cl.
| | | |
|---|---|---|
| C09D 7/00 | (2006.01) | |
| B05D 7/14 | (2006.01) | |
| C08K 3/36 | (2006.01) | |
| B05D 7/00 | (2006.01) | |
| C09D 5/02 | (2006.01) | |
| C09D 7/12 | (2006.01) | |
| C08G 18/62 | (2006.01) | |
| C09D 175/04 | (2006.01) | |

(52) U.S. Cl.
CPC ................. *C09D 7/005* (2013.01); *B05D 7/53* (2013.01); *C08G 18/6229* (2013.01); *C08G 18/6254* (2013.01); *C09D 5/028* (2013.01); *C09D 7/1225* (2013.01); *C09D 7/1283* (2013.01); *C09D 175/04* (2013.01); *B05D 2202/00* (2013.01); *B05D 2601/22* (2013.01); *C08K 3/36* (2013.01)

(58) Field of Classification Search
CPC .......... B32B 27/08; B32B 27/18; B32B 27/40; B05D 7/53; B05D 2202/00; B05D 2601/22; C09D 5/028; C09D 7/005;C09D 7/1225; C09D 7/1283; C09D 175/04; C08G 18/6229; C08G 18/6254; C08K 3/36

USPC ........................ 428/446; 524/261; 427/407.1
See application file for complete search history.

(56) References Cited

U.S. PATENT DOCUMENTS

| | | | |
|---|---|---|---|
| 4,598,131 A | 7/1986 | Prucnal | |
| 4,710,542 A | 12/1987 | Forgione et al. | |
| 4,939,213 A | 7/1990 | Jacobs, III et al. | |
| 5,084,541 A | 1/1992 | Jacobs, III et al. | |
| 5,716,678 A | 2/1998 | Rockrath et al. | |
| 6,652,915 B1 | 11/2003 | Baumgart et al. | |
| 6,770,128 B1 * | 8/2004 | Lueers et al. ................. | 106/272 |
| 2005/0065268 A1 | 3/2005 | Morea-Swift et al. | |
| 2005/0250879 A1 * | 11/2005 | Correll et al. ................ | 523/221 |
| 2005/0282022 A1 * | 12/2005 | Christian ............. | C09D 7/1283 428/446 |
| 2006/0089452 A1 | 4/2006 | Schneider et al. | |
| 2007/0049660 A1 * | 3/2007 | Wilkenhoener et al. ..... | 523/216 |
| 2008/0207842 A1 * | 8/2008 | Barthel et al. ................ | 525/418 |
| 2010/0071593 A1 * | 3/2010 | Lehnert et al. ............... | 106/270 |

FOREIGN PATENT DOCUMENTS

| | | | |
|---|---|---|---|
| DE | 10049628 A1 | 4/2002 | |
| EP | 0008127 A1 | 2/1980 | |
| EP | 0245700 B1 | 11/1987 | |

(Continued)

OTHER PUBLICATIONS

Ellis, B., "Chemistry and Technology of Epoxy Resins", Blackie Academic & Professional, 1993, pp. 1 to 35.

(Continued)

*Primary Examiner* — Thao T Tran
(74) *Attorney, Agent, or Firm* — Servilla Whitney LLC

(57) ABSTRACT

The invention relates to coating compositions based on organic solvents and comprising at least one hydroxyl-containing compound (A), at least one crosslinking agent (B) having groups reactive toward hydroxyl groups, and at least one silica gel based matting agent (M), wherein (i) the matting agent (M) is surface-modified with one or more waxes, and (ii) the coating composition further comprises at least one hydrophobic silica based rheological assistant (R).

The present invention further provides multistage coating methods using these coating compositions, and also the use of the coating compositions as clearcoat or application of the coating method for automotive OEM finishing, for the finishing of parts for installation in or on automobiles, and for automotive refinishing.

20 Claims, No Drawings

(56) References Cited

FOREIGN PATENT DOCUMENTS

| | | |
|---|---|---|
| EP | 0249201 A2 | 12/1987 |
| EP | 0276501 A2 | 8/1988 |
| EP | 0541359 B1 | 5/1993 |
| EP | 0624577 A1 | 11/1994 |
| EP | 0994117 A1 | 4/2000 |
| EP | 0692007 B1 | 12/2001 |
| EP | 1273640 A2 | 1/2003 |
| EP | 1171531 B1 | 6/2003 |
| EP | 0922671 B1 | 10/2003 |
| EP | 1431338 A1 | 6/2004 |
| EP | 1607448 A2 | 12/2005 |
| EP | 1477457 B1 | 7/2007 |
| EP | 1591492 B1 | 9/2007 |
| JP | 2003-500498 | 1/2003 |
| JP | 2005-509072 | 4/2005 |
| JP | 2008-518089 | 5/2008 |
| KR | 20060078970 A | 7/2006 |
| WO | WO9422968 A1 | 10/1994 |
| WO | WO9708250 A1 | 3/1997 |
| WO | WO9712945 A1 | 4/1997 |
| WO | WO0109260 A1 | 2/2001 |
| WO | WO2006042585 A1 | 4/2006 |
| WO | WO2010054975 A1 | 5/2010 |
| WO | WO2010121791 A1 | 10/2010 |

OTHER PUBLICATIONS

Maule, M. L. and Bogdanor, J.M., "Matting agents: Quality considerations", Surface Coatings Australia, 1994, vol. 31, pp. 6-10.
Ullmanns Enzyklopädie der technischen Chemie; 4th, revised and expanded edition; Verlag Chemie; Weinheim; Deerfield Beach, Florida; Basle, 1983, p. 3.
English Translation of International Preliminary Report on Patentability for International Application No. PCT/EP2011/068958 issued May 21, 2013, 7 pages.
Singh, B. et al., "Carbamylmethylated Melamines, Novel Crosslinkers for the Coatings Industry", Advanced Organic Coatings Science and Technology Series, 1991, vol. 13, pp. 193 to 207.
English Translation of International Search Report for International Application No. PCT/EP2011/068958 mailed Feb. 2, 2012, 3 pages.
Written Opinion for International Application No. PCT/EP2011/068958 mailed Feb. 2, 2012, 8 pages.

* cited by examiner

POLYURETHANE COATING COMPOSITION, MULTILAYER SURFACE COATINGS HAVING A MATT SURFACE PRODUCED THEREFROM AND PROCESSES FOR PRODUCING THE MULTILAYER SURFACE COATINGS

CROSS REFERENCE TO RELATED APPLICATIONS

This application is a National Phase Application of Patent Application PCT/EP2011/068958 filed on 28 Oct. 2011, which claims priority to U.S. 61/414,959 filed 18 Nov. 2010 and EP10191682.3 filed 18 Nov. 2010, of which all aforementioned applications are incorporated by reference herein in their entirety.

FIELD OF THE INVENTION

The present invention relates to thermally curable coating compositions based on organic solvents, comprising polyols (A) and crosslinking agents (B) having groups reactive toward hydroxyl groups, and at least one matting agent (M).

BACKGROUND OF THE INVENTION

For a number of years already there has been an increased desire for matt surfaces in the automotive finishing segment for example. The matt surfaces produce outstanding optical effects in the case, for example, of automobile finishes in matt silver tones, or where matt and glossy auto parts are combined. As described in the BASF Coatings GmbH News Release "BASF Coatings uses mat clearcoats in small series" of Aug. 24, 2010, matt surfaces are generally achieved through addition of matting agents to the clearcoats.

For the matting of coating compositions, use may be made, alongside organic matting agents, based for example on rubber and/or waxes, of various inorganic matting agents, more particularly based on silicates, based on fumed silica, based on precipitated silica or based on silica gel. The matting agents may optionally be surface-modified as well, with modification taking place using various organic components, such as, for example, hard, microcrystalline waxes, plastifying microcrystalline waxes and/or polyethylene waxes, and/or inorganic components, such as polysiloxanes, for example. The different matting agents and the matting agents modified with different components each have different properties and different pros and cons.

The processing of matted clearcoats, however, is a very demanding operation. Many matting agents tend to settle and to form a sediment which is difficult if not impossible to reagitate thereafter. In addition, the matted clearcoats often display inadequate resistance in the face of shearing loads, of the kind, for example, that occur in circuit lines when the paints are used in automotive OEM finishing. This inadequate resistance to shearing loads is then manifested in an unwanted increase in the glossiness of the resultant coatings. Matted clearcoats have therefore to date been used only in relatively small circuit lines for individual series. On account of the growing demand anticipated for matt surfaces, however, the desire exists to improve the matted clearcoats such that they can also be employed in standard OEM finishing.

From the article by M. L. Maule, J. M. Bogdanor in Surface Coatings Australia, 1994, Vol. 31, pages 6-10, it is now known that the sedimentation stability, for example, may be improved through surface treatment of the matting agents. Also described therein is the fact that, generally speaking, the higher the particle size of the matting agent used, the greater the matting effect. An increasing particle size on the part of the matting agents, however, is also accompanied by increased roughness of the surface and by an increased tendency toward bittiness.

EP-B-541 359 describes silica based matting agents and their use in coating compositions for producing coatings having a matt surface. According to that specification it is essential that these silica based matting agents are surface-treated with a mixture of a hard microcrystalline wax, a plasticizing microcrystalline wax, and a synthetic polyethylene wax, so that the matting agents—even after a high shearing load, as for example when incorporating the matting agents into the coating composition—exhibit a significantly improved sedimentation behavior in the coating composition. Details of how the increasing glossiness of the resultant coatings that is associated with a shearing load, particularly in circuit lines when the paints are used in automotive OEM finishing, can be avoided are absent here, as are details of how the operational window, as it is known, may be improved—that is, of how the glossiness of the resultant coating can be made to exhibit as little fluctuation as possible in response to changes in the conditions under which the coating compositions are applied and cured.

The only coating composition exemplified in EP-B-541 359 is a melamine-alkyd resin paint, while other coating compositions, based on polyurethane, for example, are not described, and nor is the combination of the silica based matting agent with rheological assistants based on hydrophilic or hydrophobic silica.

WO97/08250 likewise describes matting agents based on wax-coated silica, for which it is essential to the invention that the pore volume is at least 1.5 $cm^3/g$, the wax content is between 6% and 15%, based on the matting agent, and the wax has a melting point of 85° C. at most. These matting agents are used exclusively in UV curing coating compositions, where they have the advantage that they exhibit a good matting effect and also, at the same time, neither adversely affect the rheology of the coating compositions nor detract from the optical properties of the resultant coating.

It is known, furthermore, from EP-B-922 671 that precipitated silica based matting agents ought to have a particular particle size distribution in order first to achieve a good matting effect but also, second, not adversely to affect the appearance of the resultant coating. In that specification, however, silica gel based matting agents are not used, and the surface modification of the matting agents is not described. Nor is there any description of the combination of the matting agents with rheological assistants based on hydrophobic silica. It is known, however, that unmodified silicas have a tendency toward severe sedimentation in paints, and can therefore no longer be reagitated thereafter at all, or can be reagitated thereafter only with difficulty, and that their stability in the face of shearing loads is inadequate as well.

As already stated, it is indeed known that matting agents based on precipitated silica and coated with wax, more particularly with polyethylene wax, exhibit a substantially improved sedimentation behavior as compared with the corresponding matting agents that have not been surface-modified. However, these wax-modified matting agents frequently cause clouding of the paint. According to EP-B-1 477 457, this is avoided by subjecting the precipitated silica based matting agents to hydrophobic surface modification not with wax but instead with a modified or unmodified polysiloxane. These special matting agents are used in clearcoats, although the only clearcoat exemplified is one based on a urea-formaldehyde resin. Other clearcoats, such as polyurethane paints based on hydroxyl-containing binders and isocyanate crosslinkers, for example, are not described therein. Lastly, there is once again a lack of details as to how it is possible to avoid the increase in the glossiness of the resultant coatings that is associated with a shearing load, and of details relating to improving the operational window.

EP-B-1 171 531 discloses radiation-curable coating compositions for producing matt coatings, comprising as their matting agents wax-modified silica gels in which the wax content is between 15% and 30%, based on the overall matting agent composition, the silica gel has a pore volume of 0.8 to 1.4 cm$^3$/g, and the average particle size is between 2 and 12 μm. These matting agents are very efficient for radiation-curable coating compositions and do not adversely affect the rheology of the radiation-curable coating compositions. The combination of these special matting agents with hydrophobic silica based rheological assistants, however, is not described therein, and nor is the use of the matting agents in thermally curing coating compositions.

EP-B-1 591 492, lastly, describes two-component coating compositions comprising a polyol component, a polyisocyanate crosslinker, and at least one matting agent. Matting agents which can be used in the coating compositions are all known, surface-treated or untreated, organic or inorganic matting agents. The coating compositions are used for producing multicoat finishes having a very good, specific effect, such as a matt metallic, chromelike appearance, for example. Key to producing the multicoat finishes according to EP-B-1 591 492, therefore, is the use of two different basecoats, the first basecoat being a basecoat of the kind used customarily, and the second basecoat comprising special PVD (physical vapor deposition) aluminum pigments in order to obtain a metallic effect.

The problem on which the present invention is based was that of providing coating compositions which exhibit good circuit line stability, i.e., which suffer no increase in the glossiness of the cured coating as a consequence of the shearing load on the coating compositions that occurs in standard automotive OEM finishing when the coating compositions are applied on the line.

This shearing load is tested by pumping the coating compositions around a circuit line while exposing them to a shearing load, the conditions being as follows:
Pressure at the return check valve: 10 bar
Reciprocating strokes per minute: 18
Volume (reciprocating stroke): 0.6 l
Prior to the shearing load in the circuit line (TO=0) and after turnovers (TO) 500, 1250, 1500, and 2000 in the circuit line, the 60° gloss of the coatings is measured. The coating compositions possess sufficient circuit line stability when the gloss at an angle of 60° is increased by not more than 10 gloss units after shearing by pumped circulation in the circuit line.

Moreover, coating compositions are to be provided which exhibit good sedimentation stability, which means that, even after prolonged storage of the coating compositions for three months at ambient temperature, there is no formation of a sediment which is difficult to reagitate, or can no longer be reagitated, thereafter within not more than one hour using a customary laboratory mixer (more particularly Vollrath 370W, model "EWTHV 0.5" from Paul Vollrath GmbH & CO. KG, Hürth, speed 800 revolutions per minute, Lenart disk d=90 mm) with a speed of 800 revolutions per minute.

Furthermore, the coating compositions ought to be able to be processed with what is called an expanded operational window. This means that fluctuations in gloss or specky surfaces as a function of the application conditions of the OEM multicoat system ought to be avoided. More particularly, the gloss of the resultant coating ought to be approximately the same on pneumatic application and on ESTA application. Furthermore, the drying conditions of the basecoat and also the flash-off time of the clearcoat film ought to have little influence—if any at all—on the gloss of the multicoat finish.

Furthermore, the coatings and finishes, especially the clearcoat finishes, ought to exhibit a good appearance, depending on the intended application. This is a key requirement for the use of the coatings and finishes, more particularly the clearcoat finishes, in the particularly technologically and esthetically demanding segment of automotive OEM finishing.

In addition, the new coating compositions ought to be easy to produce with very good reproducibility, and ought not to cause any environmental problems during paint application.

SUMMARY OF THE INVENTION

In the light of the abovementioned objectives, coating compositions based on organic solvents have been found, comprising at least one hydroxyl-containing compound (A), at least one crosslinking agent (B) having groups reactive toward hydroxyl groups, and at least one silica gel based matting agent (M), wherein (i) the silica gel based matting agent (M) is surface-modified with one or more waxes and (ii) the coating composition further comprises at least one hydrophobic silica based rheological assistant (R).

In the light of the prior art it was surprising and unforeseeable for the skilled person that the objects on which the present invention is based could be achieved by means of the organic solvent based coating composition of the invention.

Hence it is particularly surprising that the coating compositions of the invention exhibit good circuit line stability, i.e., that they suffer no increase in the glossiness of the cured coating by more than 10 gloss units after the coating compositions have undergone shearing by pumped circulation in a circuit line (under the conditions of 10 bar pressure at the return check valve, 18 reciprocating strokes per minute, and a volume (reciprocating stroke) of 0.6 l). The 60° gloss of the coatings is measured prior to the shearing load in the circuit line (TO=0) and after 500, 1250, 1500, and 2000 turnovers (TO) in the circuit line.

Furthermore, the coating compositions exhibit good sedimentation stability, which means that, even after prolonged storage of the coating compositions for three months at ambient temperature, there is no formation of a sediment which is difficult to reagitate, or can no longer be reagitated, thereafter within no more than one hour using a customary laboratory mixer (more particularly Vollrath 370W, model "EWTHV 0.5" from Paul Vollrath GmbH & CO. KG, Hürth, speed 800 revolutions per minute, Lenart disk d=90 mm) with a speed of 800 revolutions per minute.

In the automotive finishing segment especially it is a particular advantage that the coating compositions of the invention can be processed with what is called an expanded operational window. This means that fluctuations in gloss or specky surfaces as a function of the application conditions of the OEM multicoat system are avoided. More particularly, the gloss of the resultant coating is approximately the same on pneumatic application and on ESTA application. Furthermore, the drying conditions of the basecoat and also the flash-off time of the clearcoat film have little influence—if any at all—on the gloss of the multicoat finish.

It is surprising, furthermore, that the coating compositions lead to coatings having a good appearance. This is a key requirement for the use of the coatings and finishes, more particularly the clearcoat finishes, in the particularly technologically and esthetically demanding segment of automotive OEM finishing.

Furthermore, using the coating compositions of the invention, coatings can be obtained whose gloss can be tailored.

Lastly, the components according to the invention can be prepared with particular ease and with very good reproducibility, and do not give rise to any significant toxicological or environmental problems on paint application.

DETAILED DESCRIPTION OF AN EMBODIMENT OF THE INVENTION

The Inventively Essential Matting Agent (M)

It is essential to the invention that the coating compositions comprise one or more silica gel based matting agents. This ensures that the coating compositions have the required circuit line stability, i.e., that the shearing load to which the coating compositions are exposed on OEM finishing, when the coating compositions are applied on the line, does not result in any increase in the glossiness of the cured coating. In addition these special matting agents exhibit very good sedimentation stability.

These silica gel based matting agents (M) are prepared, as is known, from waterglass, by reaction with mineral acids and polycondensation of the silicas, with subsequent washing to remove the salts formed. The preparation of silica gels of this kind is also described, for example, in EP-B-1 171 531, page 3, paragraph [0016].

The matting agents (M) used in accordance with the invention are surface-modified with one or more waxes. As compared with unmodified silica gel based matting agents, these matting agents (M) used in accordance with the invention have the advantage that the corresponding clearcoats exhibit significantly better sedimentation stability than clearcoats comprising unmodified silica gel matting agents.

In connection with the present invention, the term "wax" refers to all natural and synthetically obtained substances which have the following properties:

1. Kneadable at 20° C., solid to brittly hard.
2. Coarsely to finely crystalline, translucent to opaque, but not glasslike.
3. Melting without decomposition above 40° C.
4. Of relatively low viscosity even a little above the melting point.
5. Highly temperature-dependent in consistency and solubility.
6. Polishable under gentle pressure.

If a substance fails to exhibit more than one of these properties, it is no longer a "wax" for the purposes of the invention (cf. Ullmanns Enzyklopädie der technischen Chemie; 4$^{th}$, revised and expanded edition; Verlag Chemie; Weinheim; Deerfield Beach, Fla.; Basle, 1983, page 3).

The waxes may be modified and/or unmodified. All typical waxes known per se are suitable, although it is preferred to use synthetic waxes.

The waxes commonly have a number-average molecular weight of between 100 and 10 000, preferably between 300 and 1200, and drop points preferably of between 50 and 180° C., more preferably of between 60 and 120° C.

It is preferred in accordance with the invention to use silica gel based matting agents (M) modified with one or more different unmodified or modified polyolefin waxes, such as polyethylene and polypropylene waxes, and polyethylene glycol waxes. The polyethylene and polypropylene waxes are either homopolymers or copolymers with typically 0.5% to 40% by weight of comonomer units originating from saturated or unsaturated monocarboxylic acids or their amides or esters. Examples of such comonomer units include the radicals of acrylic acid, methacrylic acid, maleic acid, fumaric acid, acrylamide, stearic acid or stearamide, or vinyl acetate. The polyolefin waxes are available commercially under diverse designations.

Particular preference in accordance with the invention is given to using silica gel based matting agents (M) modified with one or more different polyolefin waxes, more particularly with one or more different linear unbranched polyolefin waxes, and very preferably with one or more different polyethylene waxes.

The surface modification may be accomplished, for example, by grinding the matting agent with the melted wax, as is described in EP-B-1 171 531, page 4, paragraphs [0018] and [0019].

Likewise preferred in accordance with the invention is the use of silica gel based matting agents (M) in which the wax content is between 3% and 20% by weight, preferably between 5% and 15% by weight, based in each case on the total weight of the matting agent.

From the article by Maule M L and Bogdanor J M "Matting agents: "Quality considerations" in Surface Coatings Australia 1994, 31(3), pages 6 to 10, it is known that, generally speaking, the higher the average particle size of the matting agents, the greater their matting effect. However, increasing average particle size of the matting agents is also accompanied by a greater tendency toward bittiness in the coatings.

It is therefore preferred for the matting agent (M) used in the coating compositions to have an average particle size of 4 to 14 µm, preferably of 5 to 13 µm, and more preferably of 6 to 12 µm. The average particle size—stated as the d50 (i.e., 50 percent by volume of the particles have a size below the stated average particle size)—is determined in accordance with the ISO 13320-1 standard for laser diffraction measurements, on a dispersion of the particles in butyl acetate (refractive index: 1.462), by laser light scattering at room temperature (23° C.), using a Malvern Mastersizer 2000 from Malvern Instruments with the MS1 mini-dispersing unit at 2000 revolutions per minute, with Fraunhofer evaluation. This is also described, for example, in EP-B-1 171 531 at page 5, lines 1 to 7.

Furthermore, the matting agent (M) preferably has a pore volume of 1.2 to 2.5 ml/g and more preferably of 1.8 to 2.0 ml/g. This pore volume is determined by means of the standard nitrogen adsorption method of Brunauer, Emmett, and Teller (BET), using an ASAP 2400 instrument from Micromeritics, as is described in EP-B-1 171 531 at page 4, paragraph [0027], section A. Generally speaking, increasing pore volume of the matting agent is accompanied by an increase in the amount of matting agent that can be incorporated into the coating composition, allowing even coating compositions with a very high matting to be achieved.

Suitable matting agents (M) are also, for example, the matting agents available commercially under the name Syloid® from W.R. Grace GmbH & Co. KG, such as, for example, Syloid® 162 C, Syloid® ED 30, Syloid® ED 40, Syloid® ED 44, Syloid® ED 50, Syloid® ED 52, Syloid® ED 56, Syloid® C 906, Syloid® C 907 and Syloid® ED 80.

It is of course also possible to use a mixture of two different matting agents or a plurality of different matting agents. The coating compositions contain preferably 2% to 20% by weight, based in each case on the nonvolatile constituents of the coating composition, of at least one matting agent (M). Two-component coating compositions comprise more preferably 8% to 17% by weight, very preferably 10% to 15% by weight, of at least one matting agent (M), and one-component coating compositions contain more preferably 4% to 14% by weight, very preferably 6% to 11% by weight, based in each case on the nonvolatile constituents of the coating composition, of at least one matting agent (M).

The Rheological Assistant (R)

It is essential to the invention that the coating compositions comprise at least one hydrophobic silica based rheological assistant (R).

Silicon dioxide, or silica, is hydrophilic per se. Preferably, therefore, the hydrophobic silica based rheological assistants (R) are prepared by the surface modification of fumed silicon dioxide with compounds containing hydrophobic groups.

Examples of suitable hydrophobic silica based rheological assistants (R) are reaction products of fumed silicon dioxide with compounds having hydrophobic groups, more particularly with organofunctional silicon compounds (I) having at least one functional group (Ia) reactive toward the hydrophilic groups of the fumed silicon dioxide, and having at least one hydrophobic radical (Ib). The compounds (I) preferably have no further groups reactive toward the other constituents of the coating composition, more particularly no other groups reactive toward the binders and/or crosslinkers.

Used with particular preference as compounds (I) are organofunctional silicon compounds having at least one alkyl group having 1 to 50 C atoms, more particularly having 1 to 10 C atoms, and having at least one hydrolyzable group and/or having at least one OH and/or NH group. Examples of compounds (I) are alkylalkoxy-silanes, more particularly dialkyldialkoxysilanes and alkyltrialkoxysilanes, alkylhalosilanes, more particularly alkylchlorosilanes, preferably trialkyl-chlorosilanes and dialkyldichlorosilanes, alkylpoly-siloxanes, dialkylpolysiloxanes, and alkyldisilazanes and the like. Also suitable as compound (I) are various monomeric and/or oligomeric silicic esters which have methoxy, ethoxy or n-propoxy or isopropoxy groups and have a degree of oligomerization of 1 to 50, more particularly 2 to 10, very preferably from 3 to 5. Other examples of suitable organofunctional compounds (I) are the organofunctional silicon compounds described in DE-A-100 49 628. Further examples of suitable compounds (I) are the products that are known and available commercially, as sold, for example, by the company Hüls under the brand name Dynasylan®. Particularly preferred compounds (I) used are dimethyldichlorosilane and/or hexamethyldisilazane and/or octyltrimethoxysilane and/or dimethylpolysiloxane. Used with especial preference as hydrophobic silica based rheological assistants (R) are reaction products of $SiO_2$ and dimethyldichlorosilane and/or hexamethyldisilazane, more particularly reaction products of $SiO_2$ and dimethyldichlorosilane.

It is preferred for the hydrophobic silica based rheological assistant (R) to have a BET surface area of 35 to 350 $m^2/g$, preferably of 100 to 300 $m^2/g$. The BET surface area in this case is determined in accordance with DIN 66 131.

The hydrophobic silica based rheological assistant (R) typically has a primary particle size of 2 to 40 nm, preferably of 5 to 20 nm. The primary particle size here is determined from the BET surface area arithmetically on the assumption of a spherical morphology.

Other suitable rheological assistants (R) include, for example, the hydrophobic silicas available commercially under the name Aerosil® from Degussa, such as, for example, Aerosil® R202, Aerosil® R805, Aerosil® R 812, Aerosil® R812S, Aerosil® R972, Aerosil® R974 and Aerosil® R 976.

It will be appreciated that it is also possible to use a mixture of two or more different rheological assistants (R).

The coating compositions of the invention contain preferably 0.01% to 3.0% by weight, more preferably 0.05% to 1.5% by weight, and more particularly 0.1% to 1.0% by weight, based in each case on the nonvolatile constituents of the coating composition, of at least one rheological assistant (R).

It will be appreciated that in the coating composition of the invention it is also possible, together with the hydrophobic silica based rheological assistant or assistants (R), to use further customary rheological assistants as well, examples being those based on hydrophilic silica or on a urea basis.

The Crosslinking Agent (B)

As component (B), the coating compositions of the invention comprise at least one compound having groups reactive toward hydroxyl groups. Crosslinking agents which can be used in this context include all of the crosslinking agents typically used that have groups reactive toward hydroxyl groups. Examples of suitable crosslinking agents are anhydride-functional compounds, amino resins, tris(alkoxycarbonylamino)triazines and derivatives thereof, compounds having free—i.e., nonblocked—and/or blocked isocyanate groups, and/or epoxy-functional compounds. Mixtures of different crosslinking agents (B) may also be used.

As component (B) use may be made, for example, of amino resins and/or epoxy resins. Preference in this context is given to aliphatic epoxy resins, which have high weathering stability. Epoxy resins of this kind are described in, for example, the monograph by B. Ellis, "Chemistry and Technology of Epoxy Resins" (Blackie Academic & Professional, 1993, pages 1 to 35). Also contemplated as component (B), instead of the epoxy resins or together with the epoxy resins, are the customary and known amino resins some of whose methylol and/or methoxymethyl groups may have been defunctionalized by means of carbamate groups or allophanate groups. This kind of crosslinking agent is described in the patent specifications U.S. Pat. No. 4,710,542 and EP-B-0 245 700, and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

As component (B) it is also possible to use tris(alkoxycarbonylamino)triazines and their derivatives. Examples of suitable tris-(alkoxycarbonylamino)triazines are those described in U.S. Pat. No. 4,939,213, column 2 line 33 to column 7 line 63, in U.S. Pat. No. 5,084,541, column 2 line 51 to column 7 line 63 and in EP-A-624 577, column 3 line 33 to column 16 line 5. Suitable tris(alkoxycarbonylamino) triazines are also available commercially under the Larotact® LR 9018 designation from the company BASF S.E.

As crosslinking agents (B), the coating compositions of the invention preferably comprise one or more compounds having free—i.e, nonblocked—and/or blocked isocyanate groups, and/or amino resins, and/or tris(alkoxycarbonylamino)triazines.

The coating compositions of the invention preferably comprise compounds (B) having free and/or blocked isocyanate groups, optionally together with further crosslinking agents, more particularly with amino resins and/or tris (alkoxycarbonylamino)triazines. Compounds (B) with blocked isocyanate groups are used preferably when the coating compositions of the invention are employed in the form of one-component (1K) systems.

Examples of preferred compounds (B) are inherently known substituted or unsubstituted aromatic, aliphatic, cycloaliphatic and/or heterocyclic polyisocyanates, preference being given to the use of aliphatic and/or cycloaliphatic polyisocyanates. Examples of preferred aliphatic and/or cycloaliphatic polyisocyanates are as follows: tetramethylene 1,4-diisocyanate, hexamethylene 1,6-diisocyanate, 2,2, 4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates.

Additionally preferred compounds (B) are the dimers and trimers, more particularly the biuret dimers and the isocyanurate trimers, of the aforementioned diisocyanates.

Particularly preferred compounds (B) are hexamethylene 1,6-diisocyanate, isophorone diisocyanate, and 4,4'-methylenedicyclohexyl diisocyanate, their biuret dimers and/or isocyanurate trimers.

In a further embodiment of the invention, the polyisocyanates are polyisocyanate prepolymers with urethane structural units, which are obtained by reacting polyols with a stoichiometric excess of aforementioned polyisocyanates. Polyisocyanate prepolymers of this kind are described in U.S. Pat. No. 4,598,131, for example.

The hydroxyl-Containing Compound (A)

As hydroxyl-containing compound (A) it is preferred to use oligomeric and/or polymeric polyols. In minor fractions, low molecular mass polyols may be admixed with the oligomeric and/or polymeric polyol component (A).

Examples of low molecular mass polyols used include diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butane-triol, pentaerythritol, and dipentaerythritol.

The preferred oligomeric and/or polymeric polyols (A) have mass-average molecular weights Mw>500 daltons as measured by means of GPC (gel permeation chromatography), preferably between 800 and 100 000 daltons, more particularly between 1000 and 50 000 daltons.

Particularly preferred are polyester polyols, polyurethane polyols, polysiloxane polyols, and especially polyacrylate polyols and/or polymethacrylate polyols, and also copolymers thereof, called polyacrylate polyols below.

The polyols preferably have an OH number of 80 to 250 mg KOH/g, more particularly between 100 and 220 KOH/g, and more preferably from 150 to 200 mg KOH/g.

The glass transition temperatures of the polyols, as measured by DSC (differential scanning calorimetry) in accordance with DIN EN ISO 11357-2, are preferably between −150 and 100° C., more preferably between −120° C. and 80° C.

Suitable polyester polyols are described in, for example, EP-A-0 994 117 and EP-A-1 273 640.

Polyurethane polyols are prepared preferably by reaction of polyester polyol prepolymers with suitable di- or polyisocyanates and are described in EP-A-1 273 640, for example. Suitable polysiloxane polyols are described in, for example, WO-A-01/09260, and the polysiloxane polyols cited therein may be employed preferably in combination with further polyols, more particularly those having higher glass transition temperatures.

The polyacrylate polyols that are especially preferred in accordance with the invention are generally copolymers and have, preferably, mass-average molecular weights Mw of between 1000 and 20 000 daltons, more particularly between 1500 and 10 000 daltons, in each case measured by means of gel permeation chromatography (GPC) against a polystyrene standard.

The glass transition temperature, Tg, of the polyacrylate polyols is situated generally between −100 and 100° C. The glass transition temperature is determined by means of DSC measurements in accordance with DIN-EN-ISO 11357-2.

The polyacrylate polyols preferably have an OH number of 80 to 250 mg KOH/g, more particularly between 100 and 220 KOH/g, and very preferably from 150 to 200 mgKOH/g.

The hydroxyl number (OH number) indicates the number of mg of potassium hydroxide that are equivalent to the amount of acetic acid bound by 1 g of substance in acetylation. For the determination, the sample is boiled with acetic anhydride-pyridine and the resultant acid is titrated with potassium hydroxide solution (DIN 53240-2).

The polyacrylate polyols (A) preferably have an acid number of between 0 and 30 mg KOH/g. The acid number here indicates the number of mg of potassium hydroxide consumed in neutralizing 1 g of the respective compound of component (A) (DIN EN ISO 2114).

Hydroxyl-containing monomer units used are preferably hydroxyalkyl acrylates and/or hydroxyalkyl meth-acrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate.

Further monomer units used for the polyacrylate polyols are preferably alkyl acrylates and/or alkyl meth-acrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl meth-acrylates, such as cyclopentyl acrylate, cyclopentyl methacrylate, isobornyl acrylate, isobornyl methacrylate or, in particular, cyclohexyl acrylate and/or cyclohexyl methacrylate.

Further monomer units which may be used for the polyacrylate polyols include vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic acid and/or methacrylic acid.

The Combination of Components (A) and (B) and Also Further Components of the Coating Composition The weight fraction of the hydroxyl-containing compounds (A) to be used, based on the weight fraction of the isocyanate-group-containing compounds (B), is dependent on the hydroxy equivalent weight of the polyol and on the equivalent weight of the compound (B)—in other words, in the case of the polyisocyanates used with preference as component (B), on the equivalent weight of the free isocyanate groups of the polyisocyanate (B).

The coating compositions of the invention preferably contain between 30% to 70% by weight, preferably 40% to 60% by weight, and more preferably 45% to 55% by weight, based in each case on the nonvolatile constituents of the coating composition, of at least one hydroxyl-containing compound (A), and/or preferably between 20% to 50% by weight, preferably 25% to 45% by weight, and more preferably 30% to 40% by weight, based in each case on the nonvolatile constituents of the coating composition, of at least one crosslinking agent (B).

The weight fractions of the polyol (A) and of the crosslinking agent (B), preferably of the polyisocyanate (B), are preferably selected such that the molar equivalent ratio of the reactive groups of component (B) (in other words, in the case of the polyisocyanates, of the isocyanate groups of the compounds (B)) to the hydroxyl groups of the hydroxyl-containing compounds (A) is between 0.7:1 and 1:1.3, preferably between 0.8:1 and 1.2:1, more preferably between 0.9:1 and 1.1:1.

Where the coating compositions are one-component compositions, the isocyanate-group-containing compounds (B) selected are those whose free isocyanate groups are blocked with the usual blocking agents. For example, the free isocyanate groups may be blocked with substituted pyrazoles, more particularly with alkyl-substituted pyrazoles, such as 3-methylpyrazole, 3,5-dimethylpyrazole, 4-nitro-3,5-dimethypyrazole, 4-bromo-3,5-dimethylpyrazole, and the like. With very particular preference the isocyanate groups of component (B) are blocked with 3,5-dimethylpyrazole.

The matting agent (M) is typically incorporated into the coating composition by first dispersing it with a portion of the binder (A), using a customary mixer. The rheological assistant (R), as well, is typically incorporated into the coating composition by first dispersing it with a portion of the binder (A), using a customary mixer. Thereafter, the resultant matting agent paste and the paste of the rheological assistant (R) are stirred with the remaining binder and, where appropriate, other of the components described below for a time sufficient to produce a homogeneous mixture. In the case of the inventively preferred two-component (2K) coating compositions, the resultant binder mixture, comprising the hydroxyl-containing compound (A), the matting agent (M), the rheological assistant (R), and further components, described below, is mixed in a conventional way, shortly before the application of the coating composition, with a further coating component comprising the crosslinking agent or agents (B) and, where appropriate, other of the components described below.

Suitable solvents for the coating compositions of the invention are more particularly those which in the coating composition are chemically inert with respect to the compounds (A) and (B) and which also do not react with (A) and (B) when the coating composition is cured. Examples of such solvents are aprotic solvents, such as, for example, aliphatic and/or aromatic hydrocarbons such as toluene, xylene, Solventnaphtha®, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents.

Besides the compounds (A), (B), (M), and (R), it is possible as component (E) to use further binders and/or crosslinkers which can preferably react with the hydroxyl groups of the compound (A) and/or with the reactive groups of the compound (B) and form network nodes.

Suitable components (E) more particularly are further binders, such as compounds containing carbamate groups, for example.

In general, such components (E) are used in fractions of up to 40% by weight, preferably of up to 30% by weight, more preferably of up to 25% by weight, based on the nonvolatile constituents of the coating composition.

Furthermore, the coating composition of the invention may comprise at least one customary and known coatings additive in effective amounts, i.e., in amounts preferably of up to 15% by weight and more preferably 0.5% to 10% by weight, based in each case on the nonvolatile constituents of the coating composition.

Examples of suitable coatings additives are as follows:
catalysts, such as, for example, amines or Lewis acids (electron-deficient compounds), such as tin naphthenate, tin benzoate, tin octoate, tin butyrate, dibutyltin diluarate, dibutyltin diacetate, dibutyltin oxide, lead octoate, and catalysts as described in WO-A-2006/042585
in particular, UV absorbers;
in particular, light stabilizers such as HALS compounds, benzotriazoles or oxalanilides;
free-radical scavengers;
slip additives;
polymerization inhibitors;
defoamers;
wetting agents such as siloxanes, fluorine-containing compounds, carboxylic monoesters, phosphoric esters, polyacrylic acids and copolymers thereof, or polyurethanes;
adhesion promoters such as tricyclodecane-dimethanol;
flow control agents;
film-forming assistants such as cellulose derivatives;
rheology control additives, such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; or synthetic polymers having ionic and/or associative groups, such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
and/or flame retardants.

In a further embodiment of the invention, the coating composition of the invention may further comprise pigments and/or fillers and may serve for producing pigmented topcoats. The pigments and/or fillers that are employed for these purposes are known to the skilled person.

Since the coatings of the invention produced from the coating compositions of the invention adhere outstandingly even to already cured electrocoat finishes, primer-surfacer finishes, basecoat finishes or customary and known clearcoat finishes, they are outstandingly suitable not only for use in automotive OEM finishing but also, where appropriate following addition of corresponding catalysts, for automotive refinishing or the finishing of plastics.

Application of the coating compositions of the invention may take place by all of the customary application methods, such as spraying, knifecoating, spreading, casting, dipping, impregnating, trickling or rolling, for example. In the course of this application, the substrate to be coated may itself be at rest, with the application equipment or unit being in movement. It is also possible, however, for the substrate to be coated, more particularly a coil, to be in movement, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray applications such as, for example, hot air spraying.

The curing of the applied coating compositions of the invention may take place after a certain rest time. The rest time is used, for example, for the leveling and degassing of the coating films, or for the evaporation of volatile constituents such as solvents. The rest time may be shortened and/or supported by the use of elevated temperatures and/or by a reduced atmospheric humidity, provided this does not entail any damage or change to the coating films, such as premature complete crosslinking, for instance.

The thermal curing of the coating compositions has no peculiarities of method, but instead takes place in accordance with the customary and known methods such as heating in a forced-air oven or irradiation with IR lamps. Thermal curing here may also take place in stages. Another preferred curing method is that of curing with near infrared (NIR radiation).

The thermal curing takes place advantageously at a temperature of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; at the temperatures employed for automotive refinishing and for the finishing of installation parts, which are preferably 30 and 90° C., longer cure times may also be employed.

Even when cured at low temperatures of no more than 90° C., of the kind customary in the field of the coating of plastics parts, for parts for installation in or on automobiles, for example, or in the area of automotive refinishing, the coating compositions, generally following addition of a suitable catalyst, lead to coatings having a very good optical quality. At the same time, the coating compositions of the invention exhibit good circuit line stability, i.e., no increase in the glossiness of the cured coating, as a result of the shearing load occurring in the circuit line, by more than 10 gloss units, thus making the coating compositions of the invention very suitable as well for automotive OEM finishing or production-line automotive finishing.

Moreover, the coating compositions exhibit good sedimentation stability, which means that, even after prolonged storage of the coating compositions for three months at ambient temperature, there is no formation of a sediment which is difficult to reagitate, or can no longer be reagitated, thereafter within no more than one hour using a customary laboratory mixer (more particularly Vollrath 370W, model "EWTHV 0.5" from Paul Vollrath GmbH & CO. KG, Hürth, speed 800 revolutions per minute, Lenart disk d=90 mm) with a speed of 800 revolutions per minute.

In the automotive finishing segment especially it is a particular advantage that the coating compositions of the invention can be processed with what is called an expanded operational window. This means that fluctuations in gloss or specky surfaces as a function of the application conditions of the OEM multicoat system are avoided. More particularly, the gloss of the resultant coating is approximately the same on pneumatic application and on ESTA application. Furthermore, the drying conditions of the basecoat and also the flash-off time of the clearcoat film have little influence—if any at all—on the gloss of the multicoat finish.

The coating compositions of the invention, furthermore, afford new cured coatings, more particularly paint systems, especially clearcoat finishes, moldings, especially optical moldings, and self-supporting films, that have a matt surface.

The coating compositions of the invention are therefore outstandingly suitable as decorative, protective and/or effect-imparting, highly scratch-resistant coatings and finishes on bodywork of means of transport (more particularly motor vehicles, such as motorcycles, buses, trucks or automobiles) or of parts thereof; of edifices, both in the interior area and in the exterior area; of furniture, windows, and doors; of plastics moldings, more particularly CDs and windows; of small industrial parts, of coils, freight containers, and packaging; of white goods; of sheets; of optical, electrical, and mechanical components; and also of hollow glassware and articles of everyday use.

More particularly, the coating compositions and finishes of the invention, especially the clearcoats, are used in the particularly technologically and esthetically demanding field of automotive OEM finishing and also of automotive refinishing. With particular preference the coating compositions of the invention are used in multistage coating processes, more particularly in processes in which an uncoated or precoated substrate is coated first with a pigmented basecoat film and thereafter with a film comprising the coating composition of the invention.

Not only water-dilutable basecoats but also basecoats based on organic solvents can be used. Suitable basecoats are described in, for example, EP-A-0 692 007 and in the documents cited therein at column 3 lines 50 et seq. The applied basecoat is preferably first dried, which means that, in an evaporation phase, at least part of the organic solvent and/or water is removed from the basecoat film. Drying takes place preferably at temperatures from room temperature to 80° C. After drying has taken place, the coating composition of the invention is applied. Subsequently the two-coat finish is baked, preferably under conditions employed in the context of automotive OEM finishing, at temperatures of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; in the case of the temperatures employed for automotive refinishing and for the finishing of parts for installation, which are preferably between 30 and 90° C., longer cure time may also be employed.

EXAMPLES

The Curing Agent (B1)

Used as curing agent is a mixture of 89.6 parts of a 90% strength solution of a commercial trimerized hexamethylene diisocyanate (HDI) in Solventnaphtha®/butyl acetate (commercial product Basonat® HI190 from BASF SE), 5.2 parts of butyl acetate, and 5.2 parts of Solventnaphtha®.

Polymethacrylate Polyol (A1)

Used as binder in the 2K clearcoats is a polymethacrylate polyol based on 2-hydroxypropyl methacrylate, cyclohexyl methacrylate, 2-ethylhexyl methacrylate, 2-ethylhexyl acrylate, and acrylic acid, having an OH number (calculated) of 180 mg KOH/g, an acid number (calculated) of 7 mg KOH/g, and a solids content (1 h 150° C.) of 65%.

Polyol (A2)

Used as binder in the 1K clearcoats is a polyol based on hydroxyethyl acrylate, styrene, and n-butyl acrylate, having an OH number (calculated) of 131 mg KOH/g, an acid number (calculated) of 2 mg KOH/g, and a solids content (1 h 150° C.) of 60%.

Preparation of a Paste of Hydrophobic Nanoparticles Based on Fumed Silica (R1)

In a laboratory agitator mill from Vollrath, 800 g of millbase consisting of 323.2 g of a polymethacrylate polyol (A2) based on hydroxyethyl acrylate, 4-hydroxybutyl acrylate, 2-ethylhexyl methacrylate, n-butyl methacrylate, styrene, and acrylic acid, having an OH number (calculated) of 175 mg KOH/g, an acid number (calculated) of 10 mg KOH/g, and a solids content (1 h 150° C.) of 65%, 187.2 g of butanol, 200.8 g of xylene, and 88.8 g of Aerosil® R812S (Degussa AG, Hanau, BET surface area=220±25 $m^2/g$, average primary particle size 7 nm; hydrophobically modified fumed silica) were weighed out together with 1100 g of quartz sand (grain size 0.7-1 mm) and dispersed for 30 minutes with water cooling. The grinding media were then separated off.

Preparation of a Paste of Hydrophilic Nanoparticles Based on Fumed Silica (RC1)

In a laboratory agitator mill from Vollrath, 1000 g of millbase consisting of 750 g of the polymethacrylate polyol (A3) based on 2-hydroxypropyl methacrylate, hydroxyethyl methacrylate, cyclohexyl methacrylate, n-butyl methacrylate, styrene, and acrylic acid, having an OH number (calculated) of 156 mg KOH/g, an acid number (calculated) of 10 mg KOH/g, and a solids content (1 h 150° C.) of 65%, 163 g of butyl acetate and 87 g of Aerosil® R380 (Degussa AG, Hanau, BET surface area=380±30 $m^2/g$, average primary particle size 7 nm; hydrophilically modified fumed silica) were weighed out together with quartz sand (grain size 0.7-1 mm) and dispersed for 30 minutes with water cooling. The grinding media were then separated off.

Preparation of the Coating Compositions and Production of the Multicoat Finishes of Examples 1 to 10 and of Comparative Examples C1 to C13

The binder mixtures of inventive example 1 and the binder mixtures of comparative examples C1 to C3 are prepared by first dispersing the matting agent with a portion of the binder (A1), using a conventional laboratory mixer (Vollrath 370W, model "EWTHV 0,5" from Paul Vollrath GmbH & CO. KG, Hürth, rotational speed 1200 revolutions per minute, toothed disk d=90 mm) with a rotary speed of 1200 revolutions per minute for 30 minutes. The matting paste of inventive example 1 obtained in this way, and the matting pastes of comparative examples C1 to C3, are combined with the components specified in table 1, and stirring takes place until a homogeneous mixture is produced.

TABLE 1

Composition of the binder mixture of inventive example 1 and of comparative examples C1 to C3, in parts by weight

| | Example | | | |
|---|---|---|---|---|
| | C1 | C2 | C3 | E1 |
| Polyol (A1) | 61 | 61 | 61 | 61 |
| Butyldiglycol acetate | 5.4 | 5.4 | 5.4 | 5.4 |
| Butylglycol acetate | 3.3 | 3.3 | 3.3 | 3.3 |
| Butyl acetate | 5.1 | 5.1 | 5.1 | 5.1 |
| Solventnaphtha ® | 2.5 | 2.5 | 2.5 | 2.5 |
| Ethoxypropyl acetate | 4.0 | 4.0 | 4.0 | 4.0 |
| Butanol | 0.2 | 0.2 | 0.2 | 0.2 |
| Flow control agent[1] | 0.15 | 0.15 | 0.15 | 0.15 |
| UV absorber[2] | 1.0 | 1.0 | 1.0 | 1.0 |
| HALS[3] | 0.8 | 0.8 | 0.8 | 0.8 |
| Acematt ® OK 412 (MV1)[4] | 8.5 | 6.5 | | |
| Syloid ® ED 30 (M1)[5] | — | — | 11.0 | 10.0 |
| Butyl acetate | 7.9 | 7.9 | 7.9 | 7.9 |
| Hydrophobic silica (R1)[6] | — | 2.0 | — | 2.0 |

Key to table 1:

[1] Commercial flow control agent from Byk Chemie GmbH, based on a modified polysiloxane, amount based on pure active substance i.e. amount without solvent

[2] Commercial light stabilizer based on a UV absorber

[3] Commercial light stabilizer based on HALS (sterically hindered amine)

[4] Commercial matting agent Acematt ® OK 412 from Degussa AG, based on silica with wax aftertreatment, with an average particle size of 3 μm (determined by transmission electron microscopy), a d50 (determined by laser diffraction in a method based on ISO 13320-1) of 6.0 μm, and an oil number (method based on DIN EN ISO 787-5) of 220 g/100 g

[5] Commercial matting agent Syloid ® ED 30 from W.R. Grace & Co. (=M1), Davison Chemical Division, based on silica gel with wax aftertreatment, with a wax content of 10% by weight (calculated from the carbon content of the matting agent), a measured average particle size (d50) of 5.6 μm (the average particle size here is in each case determined in accordance with the ISO 13320-1 standard for laser diffraction measurements, on a dispersion of the particles in butyl acetate (refractive index: 1.462), by laser light scattering at room temperature (23° C.), using a Malvern Mastersizer 2000 from Malvern Instruments with the mini-dispersing unit MS1 at 2000 revolutions per minute, with Fraunhofer evaluation), a pore volume ($H_2O$) of 1.8 ml/g (determined by the GRACE Q 53 test method), and an oil number (method based on DIN EN ISO 787-5) of 300 g/100 g

[6] Above-described paste of hydrophobic nanoparticles based on fumed silica (R1)

The sedimentation stability of the binder mixtures is determined by storing the binder mixtures at room temperature and inspecting the binder mixtures for appearance of sediment after 1 week, after 7 weeks, and after 9 weeks. If sediment appears, it ought to be possible to completely restore the mixture by reagitation within a period of not more than 1 hour, using a conventional laboratory mixer (more particularly Vollrath 370W, model "EWTHV 0,5" from Paul Vollrath GmbH & CO. KG, Hürth, rotation speed 800 revolutions per minute, Lenart disk d=90 mm) with a rotational speed of 800 revolutions per minute. The results are reported in table 2.

In addition, in analogy, binder mixtures were produced with different other matting agents, instead of the matting agent (M1) of the invention, and the sedimentation stability of these binder mixtures was likewise investigated. The results are likewise reported in table 2.

TABLE 2

Sedimentation stability of the binder mixtures of inventive examples 1 to 5 and of comparative examples C1 and C4 to C7

| Example | Matting agent | Reagitatability 1 week | Reagitatability 7 weeks | Reagitatability 9 weeks |
|---|---|---|---|---|
| 1 | Syloid ® ED 30[1)] | OK | OK | OK |
| 2 | Syloid ® ED 162 C[2)] | OK | OK | OK |
| 3 | Syloid ® C 907[3)] | OK | OK | OK |
| 4 | Syloid ® ED 40[4)] | OK | OK | OK |
| 5 | Syloid ® ED 80[5)] | OK | OK | OK |
| C1 | Acematt ® OK 412[6)] | OK | Sediment, still agitatable | Sediment, still agitatable |
| C4 | Syloid ® C 807[7)] | Sediment, not agitatable | Sediment, not agitatable | — |
| C5 | Acematt ® TS 100[8)] | Sediment, still agitatable | Sediment, not agitatable | — |
| C6 | Pergopak ® M3[9)] | Sediment, still just agitatable | Sediment, not agitatable | — |
| C7 | Syloid ® 621[10)] | Sediment, not agitatable | Sediment, not agitatable | — |

Key to table 2:
[1)]Commercial matting agent Syloid ® ED 30 from W.R. Grace & Co. (=M1), Davison Chemical Division, described under table 1, based on silica gel with wax aftertreatment, having a wax content of 10% by weight, a measured average particle size (d50) of 5.6 µm, a pore volume ($H_2O$) of 1.8 ml/g, and an oil number of 300 g/100 g
[2)]Commercial matting agent Syloid ® 162 C from W.R. Grace & Co., Davison Chemical Division, based on silica gel with organic aftertreatment, having a measured average particle size (d50) of 7 µm (determined, in the same way as for the particle size of Syloid ® ED30, on a dispersion of the particles in butyl acetate (refractive index: 1.462) by laser light scattering at room temperature (23° C.), with a Malvern Mastersizer 2000 from Malvern Instruments, with the MS1 mini-dispersing unit, at 2000 revolutions per minute, with Fraunhofer evaluation), a pore volume ($H_2O$) of 1.2 ml/g (determined by the GRACE Q 53 test method)
[3)]Commercial matting agent Syloid ® C 907 from W.R. Grace & Co., Davison Chemical Division, based on silica gel with organic aftertreatment for UV curable systems, having an average particle size of 7 µm (determined by laser diffraction with Malvern Mastersizer 2000, Fraunhofer evaluation) and a pore volume ($H_2O$) of 2.0 ml/g (determined by the GRACE Q 53 test method)
[4)]Commercial matting agent Syloid ® ED 40 from W.R. Grace & Co. (=M1), Davison Chemical Division, based on silica gel with wax aftertreatment, having an average particle size of 7 µm (determined by laser diffraction with Malvern Mastersizer 2000, Fraunhofer evaluation) and a pore volume ($H_2O$) of 1.8 ml/g (determined by the GRACE Q 53 test method)
[5)]Commercial matting agent Syloid ® ED 80 from W.R. Grace & Co. (=M1), Davison Chemical Division, based on silica gel with wax aftertreatment, having an average particle size of 11 µm (determined, in the same way as for the particle size of Syloid ® ED30, on a dispersion of the particles in butyl acetate (refractive index: 1.462) by laser light scattering at room temperature (23° C.), with a Malvern Mastersizer 2000 from Malvern Instruments, with the MS1 mini-dispersing unit, at 2000 revolutions per minute, with Fraunhofer evaluation), and a pore volume ($H_2O$) of 1.8 ml/g (determined by the GRACE Q 53 test method)
[6)]Commercial matting agent Acematt ® OK 412 from Degussa AG, based on silica with wax aftertreatment, with an average particle size of 3 µm (determined by transmission electron microscopy), a d50 (determined by laser diffraction in a method based on ISO 13320-1) of 6.0 µm, and an oil number (method based on DIN EN ISO 787-5) of 220 g/100 g
[7)]Commercial matting agent Syloid ® C 807 from W.R. Grace & Co., Davison Chemical Division, based on silica gel without aftertreatment, having an average particle size of 7 µm (determined by laser diffraction with Malvern Mastersizer 2000, Fraunhofer evaluation) and a pore volume ($H_2O$) of 2.0 ml/g (determined by the GRACE Q 53 test method)
[8)]Commercial matting agent Acematt ® TS 100 from Degussa AG, based on fumed silica without organic aftertreatment, having an average particle size of 9 µm (determined, in the same way as for the particle size of Syloid ® ED30, on a dispersion of the particles in butyl acetate (refractive index: 1.462) by laser light scattering at room temperature (23° C.), with a Malvern Mastersizer 2000 from Malvern Instruments, with the MS1 mini-dispersing unit, at 2000 revolutions per minute, with Fraunhofer evaluation),
[9)]Commercial matting agent Pergopak ® M3 from the company, based on a urea formaldehyde condensate, having an average particle size (laser diffraction) of 6 to 8.5 µm and an oil number (method based on DIN EN ISO 787-5) of 310 g/100 g
[10)]Commercial matting agent Syloid ® 621 from W.R. Grace & Co., Davison Chemical Division, based on silica gel without aftertreatment, having an average particle size of 10 µm # (determined by laser diffraction with Malvern Mastersizer 2000, Fraunhofer evaluation) and a pore volume ($H_2O$) of 1.2 ml/g (determined by the GRACE Q 53 test method)

The results for examples 1 to 5 in table 2 illustrate the fact that only the matting agents used in accordance with the invention, based on silica gel with wax aftertreatment, exhibit the required good sedimentation stability. At best, the use of the commercial matting agent Acematt® OK 412 from Degussa AG, based on silica with wax aftertreatment, in comparative example C1, still gives coating compositions having a moderate sedimentation stability, but one which is often inadequate. The use of this Acematt® OK 412 matting agent in comparative example C1, however, results in coating compositions that have an inadequate circuit line stability, as is apparent from table 3 below.

In view of the entirely inadequate sedimentation stability of the binder mixtures of comparative examples C4 to C8, and hence their lack of suitability as clearcoats for automotive OEM finishing, no further investigations were carried out with these comparative examples C4 to C8.

The clearcoats of inventive examples 1 to 5 and the clearcoats of comparative examples C1 to C3 are prepared by adding 33 parts of the curing agent mixture in each case to 100 parts of the binder mixtures from each of inventive example 1 and, respectively, inventive examples 2 to 5, and of the binder mixtures of comparative examples C1 to C3, and each of the systems is then stirred until a homogeneous mixture is produced.

Set out below by way of example are the further test results for the clearcoat of example E1, in comparison with the clearcoats of comparative examples C1 and C3. The circuit line stability of the clearcoats of example 1 and of comparative examples C1 and C3 was tested by pumping the clearcoats in a circuit line while subjecting them to a shearing load, the conditions being as follows:

Pressure at the return check valve: 10 bar
Reciprocating strokes per minute: 18
Volume (reciprocating stroke): 0.6 l Prior to the shearing load in the circuit line (TO=0), and after 500, 1250, 1500, and 2000 turnovers (TO) in the circuit line in each case, the 60° gloss of the coatings of example 1 and of comparative examples C1 and C3 is measured. The circuit line stability of the coating compositions is sufficient when the gloss at an angle of 60°, after shearing by pumped circulation in a circuit line, is increased by not more than 10 gloss units. The gloss was measured in each case at 60° using a commercial gloss meter: Byk Gardner, micro-TRI-gloss, Cat. No. 4520 from Byk Gardner. The results are presented in table 3.

TABLE 3

Circuit line stability of the clearcoats of example 1 and of comparative examples C1 and C3

| Number of TO in circuit line | Comp. ex. C1 | Comp. ex. C3 | Example 1 |
|---|---|---|---|
| 0 | 19 | 16 | 25 |
| 500 | 27 | 16 | 29 |
| 1250 | 38 | 17 | 31 |
| 1500 | 42 | 16 | 32 |
| 2000 | 50 | 16 | 32 |

The comparison of the results for example 1 and for comparative example C3 with those for comparative example C1 in table 3 shows that the use of silica gel based matting agents produces an improved circuit line stability by comparison with silica based matting agents. As far as the circuit line stability is concerned, it makes no major difference whether the coating composition additionally still comprises the hydrophobic silica based rheological assistant (R)—as in example 1—or whether the coating composition comprises only silica gel based matting agent, and no hydrophobic silica based rheological assistant (R)—as in comparative example C3. However, the coating composition of said comparative example C3 has an insufficient operational window, as is evident from tables 4 to 6 below.

A wide and hence good or very good operational window denotes in this context that there is avoidance of gloss fluctuations or mottled surfaces as a function of the mode of application and of other application conditions, such as flash-off and baking conditions of the multilayer OEM system, for example, outflow rates of the coating compositions, and so on. With a good operational window, in particular, the gloss of the resultant coating is approximately the same for pneumatic application and for ESTA application. Furthermore, the drying conditions of the basecoat and also the flash-off time of the clearcoat film have only a little influence—if any at all—on the gloss of the multicoat finish.

The operational window of the coating was assessed following application of the clearcoats of example 1 and of comparative examples C1 and C3 to a commercial waterborne basecoat, color Alanitgrau (gray), from BASF Coatings AG. The basecoat was applied beforehand to commercial bonderized steel panels from Chemetall, which were coated with a commercial baked electrocoat from BASF Coatings AG and with a commercial baked primer from BASF Coatings AG. Thereafter, each of the resultant coatings was flashed off at room temperature and then baked at 140° C. for 22 minutes. The gloss was measured, in each case at 60° C., using a commercial Byk Gardner gloss meter, micro-TR1-gloss, Cat. No. 4520 from Byk Gardner.

Table 4 presents the relationship between the gloss and the preliminary drying of the basecoat, for the clearcoats of example 1 and of comparative examples C1 and C3.

TABLE 4

Relationship between gloss and preliminary drying of the basecoat

| Oven temperature [° C.] | Comp. ex. C1 | Comp. ex. C3 | Ex. 1 |
|---|---|---|---|
| 55 | 17 | 23 | 16 |
| 65 | 18 | 39 | |
| 70 | 18 | | 18 |
| 80 | 22 | 42 | |
| 140 | 39 | | 25 |
| Operational window | moderate | poor | very good |

A comparison of inventive example E1 with comparative examples C1 and C3 in table 4 shows that the addition of the rheological assistant based on hydrophobically modified silica (R1) results only in a slight difference in gloss for the resultant coating of example E1, even with massively different preliminary drying of the basecoat, once at 55° C. and the other time at 140° C., and hence in a very good operational window, whereas, without the addition of the rheological assistant based on hydrophobically modified silica, the gloss of the resultant coating both for comparative example C1 and for comparative example C3 exhibits a very heavy dependency on the preliminary drying of the basecoat. If the coating composition comprises a silica based matting agent but no rheological assistant based on hydrophobically modified silica (comparative example C1), however, the dependency of the gloss on the preliminary drying of the basecoat is not so heavily pronounced as for coating compositions which comprise a silica gel based matting agent but no rheological assistant based on hydrophobically modified silica (comparative example C3). As already shown in table 3, these coating compositions with silica based matting agents (comparative example C1), however, have the disadvantage, in particular, of inadequate circuit line stability.

Table 5 presents the relationship between the gloss and the mode of application of the clearcoat. In the area of automotive OEM finishing, the clearcoat is applied on the line, on a standard basis, by means of ESTA. In certain plants, however, pneumatic application by hand is used additionally, for the purpose of painting the folds or for painting lean areas, for example. Here again, the gloss should as far as possible be the same in both modes of application for the same clearcoat.

TABLE 5

Relationship between the gloss and the mode of application of the clearcoat

| | ESTA | Hand application | Operational window |
|---|---|---|---|
| Comp. ex. C1 | 18 | 27 | moderate |
| Comp. ex. C3 | 22 | 53 | poor |
| Ex. 1 | 18 | 20 | very good |

The comparison of inventive example E1 with comparative examples C1 and C3 shows that only through the addition of the rheological assistant based on hydrophobically modified silica, with simultaneous use of the matting agent of the invention based on surface-modified silica gel, does the gloss of the resultant coating show virtually no dependence on the mode of application, in other words ensuring a very good operational window.

Table 6 presents the relationship between the gloss and the flash-off time of the clearcoat, for example 1 and for comparative examples C1 and C3.

TABLE 6

Relationship between gloss and flash-off time of the clearcoat for example 1 and comparative examples C1 and C3

| Clearcoat flash-off time [min] | Comp. ex. C1 | Comp. ex. C3 | Example 1 |
|---|---|---|---|
| 5 | 18 | 39 | 17 |
| 10 | 19 | 29 | 17 |
| 20 | 20 | 20 | |
| 30 | 26 | | 18 |
| Operational window | moderate | poor | very good |

A comparison of inventive example E1 with comparative example C3 shows again that the addition of the rheological assistant based on hydrophobically modified silica means that the gloss of the resultant coating is not dependent on the flash-off time of the clearcoat, whereas without this addition—as in comparative example C3—there is a distinct relationship observable between the gloss and the flash-off time of the clearcoat.

Additionally investigated was the use of further, different rheological assistants in the matted clearcoats. For this purpose, in the same way as for the clearcoat of example E1, different rheological assistants were added to the Syloid® ED 30 based clearcoat from comparative example 3. The composition of the corresponding binder mixtures is shown in table 7. The clearcoats of inventive examples E6 to E9 and the clearcoats of comparative examples C8 to C11 are prepared by adding 33 parts of the curing agent mixture to 100 parts of each of the binder mixtures from inventive examples E6 to E9 and the binder mixtures of comparative examples C8 to C11, and stirring the systems until a homogeneous mixture is produced.

TABLE 7

Composition of the binder mixtures of inventive examples E6 to E9 and of comparative examples C8 to C11, in parts by weight

| Example | E6 | E7 | E8 | E9 | C8 | C9 | C10 | C11 |
|---|---|---|---|---|---|---|---|---|
| Polyol (A1) | 59.9 | 59.9 | 59.9 | 59.9 | 59.9 | 59.9 | 59.9 | 59.9 |
| Butyldiglycol acetate | 5.3 | 5.3 | 5.3 | 5.3 | 5.3 | 5.3 | 5.3 | 5.3 |
| Butylglycol acetate | 3.3 | 3.3 | 3.3 | 3.3 | 3.3 | 3.3 | 3.3 | 3.3 |
| Butyl acetate | 5.1 | 5.1 | 5.1 | 5.1 | 5.1 | 5.1 | 5.1 | 5.1 |
| Solvent naphtha ® | 2.5 | 2.5 | 2.5 | 2.5 | 2.5 | 2.5 | 2.5 | 2.5 |
| Ethoxypropyl acetate | 3.75 | 3.75 | 3.75 | 3.75 | 3.75 | 3.75 | 3.75 | 3.75 |
| Butanol | 0.2 | 0.2 | 0.2 | 0.2 | 0.2 | 0.2 | 0.2 | 0.2 |
| Flow control agent[1] | 0.15 | 0.15 | 0.15 | 0.15 | 0.15 | 0.15 | 0.15 | 0.15 |
| UV absorber [2] | 1.0 | 1.0 | 1.0 | 1.0 | 1.0 | 1.0 | 1.0 | 1.0 |
| HALS [3] | 0.8 | 0.8 | 0.8 | 0.8 | 0.8 | 0.8 | 0.8 | 0.8 |
| Syloid® ED 30 (M1) [4] | 10.0 | 10.0 | 10.0 | 10.0 | 10.0 | 10.0 | 10.0 | 10.0 |
| Butyl acetate | 9.0 | 9.0 | 9.0 | 9.0 | 9.0 | 7.0 | 7.0 | 7.0 |
| Hydrophobic silica (R1) [5] | 1.0 | 2.0 | 4.0 | 2.0 | | | | |
| Hydrophilic silica (RC1) [6] | | | | | 2.0 | 2.0 | | |
| Wax paste (RC2) [7] | | | | | | | 6.0 | |
| Modified urea (RC3) [8] | | | | | | | | 10.0 |
| Polycarboxylic salt of polyamineamides (RC4) [9] | | | | | | | | 0.2 |
| Total parts by weight | 102 | 103 | 105 | 105 | 103 | 105 | 109 | 99.2 |

Key to table 7:
[1] Commercial flow control agent from Byk Chemie GmbH, based on a modified polysiloxane, amount based on pure active substance, i.e., amount without solvent
[2] Commercial light stabilizer based on a UV absorber
[3] Commercial light stabilizer based on HALS (sterically hindered amine)
[4] Commercial matting agent described under table 1, Syloid ® ED 30 from W.R. Grace & Co. (=M1), Davison Chemical Division, based on silica gel with wax aftertreatment, with a wax content of 10% by weight, a measured average particle size (d50) of 5.6 µm, a pore volume ($H_2O$) of 1.8 ml/g, and an oil number of 300 g/100 g
[5] Above-described paste of hydrophobic nanoparticles based on fumed silica (R1)
[6] Above-described paste of hydrophilic nanoparticles based on fumed silica (RC1)
[7] (RC2) = paste of commercial polyamide wax Disparlon ® 6900-20X from C. H. Erbslöh KG, ground in the above-described binder (A1), wax content 3% by weight, based on total paste weight
[8] Commercial rheological assistant (RC3) Setal ® 8146 SS55 from Nuplex, based on a 55% strength solution of a modified urea,
[9] Commercial wetting agent and dispersant (RC4) Antiterra 204 from Byk Chemie GmbH, based on a solution of a polycarboxylic salt of polyamineamides, 52% strength in methoxypropanol/-alkylbenzenes 3/2

In the same way as for the coating of example E1, the resulting clearcoats were applied to a commercial waterborne basecoat Alanitgrau (gray) from BASF Coatings AG which had been flashed off at 70° C. for 5 minutes beforehand. The basecoat was applied beforehand to commercial bonderized steel panels from Chemetall which were coated with a commercial baked electrocoat from BASF Coatings AG and with a commercial baked primer from BASF Coatings AG. Thereafter the resultant basecoat-clearcoat coating is flashed off at room temperature and then baked at 140° C. for 22 minutes.

The gloss was measured in each case at 60° using a commercial Byk Gardner gloss instrument, micro-TR1-gloss, Cat. No. 4520 from Byk Gardner. The clearcoat was applied initially only by hand, since this application is more critical in terms of gloss. If the resulting cured coating had a gloss of below 30 units, ESTA application took place additionally. The results are presented in table 8.

TABLE 8

Gloss of the coatings of examples E6 to E9 and of comparative examples C8 to C11 as a function of flow control agent added

| | Nature and amount of flow control agent (R) | ESTA gloss | Hand gloss |
|---|---|---|---|
| Ex. 6 | 1% paste of hydrophobic silica. (R1)[1] | 19 | 22 |
| Ex. 7 | 2% paste of hydrophobic silica. (R1)[1] | 20 | 22 |
| Ex. 8 | 4% paste of hydrophobic silica. (R1)[1] | 22 | 25 |
| Ex. 9 | 2% paste of hydrophobic silica. (R1)[1] + 2% paste of hydrophilic silica. (RC1)[2] | 21 | 22 |

TABLE 8-continued

Gloss of the coatings of examples E6 to E9 and of comparative examples C8 to C11 as a function of flow control agent added

|  | Nature and amount of flow control agent (R) | ESTA gloss | Hand gloss |
|---|---|---|---|
| Comp. ex. C8 | 2% paste of hydrophilic silica. (RC1)[2)] | — | 38 |
| Comp. ex. C9 | Wax paste (RC2)[3)] | — | 55 |
| Comp. ex. C10 | Modified urea (RC3)[4)] | — | 44 |
| Comp. ex. C11 | Polycarboxylic salt of polyamineamides (RC4)[5)] | — | 57 |

Key to table 8:
[1)]Above-described paste of hydrophobic nanoparticles based on fumed silica (R1)
[2)]Above-described paste of hydrophilic nanoparticles based on fumed silica (RC1)
[3)](RC2) = paste of commercial polyamide wax Disparlon ® 6900-20X from C.H. Erbsloh KG, ground in the above-described binder (A1), wax content 3% by weight, based on total paste weight
[4)]Commercial rheological assistant (RC3) Setal ® 8146 SS55 from Nuplex, based on a 55% strength solution of a modified urea,
[5)]Commercial wetting agent and dispersant (RC4) Antiterra 204 from Byk Chemie GmbH, based on a solution of a polycarboxylic salt of polyamineamides, 52% strength in methoxypropanol/-alkylbenzenes 3/2

A comparison of examples 6 to 9 shows that the inventive use of the rheological assistant (R1) based on hydrophobic silica in combination with silica gel based matting agents (M) produces clearcoats with a very good operational window (virtually no differences in gloss on ESTA application and on hand application), and that an increase in the amount of rheological assistant (R) used beyond 1% by weight produces no further improvement in the operational window, but does not impair the operational window either.

Moreover, a comparison of example 9 with example 7 shows that the addition of a further rheological assistant (RC1) based on hydrophilic silica does not result in any deterioration in the operational window. Conversely, a comparison of examples 6 to 9 with comparative example C8 shows that the sole addition of a rheological assistant (RC1) based on hydrophilic silica does not provide any improvement in the operational window.

Furthermore, a comparison of examples 6 to 9 with comparative examples C9 or C10 or C11 shows that neither the addition of wax-based rheological assistants nor the addition of rheological assistants based on modified ureas, nor yet the addition of wetting agents and dispersants based on a polycarboxylic salt of polyamineamides, has any positive consequences for the gloss of the coatings.

Lastly, in the same way as for the 2K clearcoats, the matted 1K clearcoat of inventive example 10 and the matted 1K clearcoats of comparative examples C12 and C13 were prepared. For this purpose, first of all, the matting agent was dispersed with a portion of the binder (A2), using a conventional laboratory mixer (Vollrath 370W, model "EWTHV 0,5" from Paul Vollrath GmbH & CO. KG, Hürth, rotational speed 1200 revolutions per minute, toothed disk d=90 mm) with a speed of 1200 revolutions per minute, for 30 minutes. The resultant matting paste of inventive example 10 and the matting pastes of comparative examples C12 to C13 are combined with the components specified in table 9, and stirring is carried out until a homogeneous mixture is produced.

TABLE 9

Composition of the clearcoats of example 10 and of comparative examples C12 and C13, in parts by weight

|  | Comparative example C12 | Comparative example C13 | Example 10 |
|---|---|---|---|
| Polyol (A2)[1)] | 32.5 | 32.5 | 31.8 |
| Xylene | 0.9 | 0.9 | 0.9 |
| Luwipal 018 BX[2)] | 23.9 | 23.9 | 23.5 |
| Butanol | 3.5 | 3.5 | 3.5 |
| Polyol (A3)[3)] | 12.2 | 12.2 | 12.0 |
| Xylene | 2.8 | 2.8 | 2.8 |
| Light stabilizer[4)] | 1.1 | 1.1 | 1.1 |
| Flow control agent[5)] | 0.13 | 0.13 | 0.13 |
| Flow control agent[6)] | 0.1 | 0.1 | 0.1 |
| Flow control agent[7)] | 0.1 | 0.1 | 0.1 |
| Amine-blocked p-toluenesulfonic acid)[8)] | 0.7 | 0.7 | 0.6 |
| Butylglycol acetate | 2.6 | 2.6 | 2.6 |
| Solventnaphtha ® | 1.8 | 1.8 | 1.7 |
| Butylglycol acetate | 1.8 | 1.8 | 1.7 |
| Xylene | 3.9 | 3.9 | 3.8 |
| Butylglycol acetate | 2.0 | 2.0 | 2.0 |
| Xylene | 6.1 | 6.1 | 5.8 |
| Acematt ® OK 412[9)] | 3.9 |  |  |
| Syloid ® ED30[10)] |  | 3.9 | 3.9 |
| Hydrophobic silica (R1)[11)] |  |  | 2.0 |
| Total | 100.0 | 100.0 | 100.0 |

Key to table 9:
[1)]Above-described polyol (A2)
[2)]Commercial melamine-formaldehyde resin, partially etherified with butanol, from BASF AG, 64-68% strength in n-butanol/xylene 2:1
[3)]Setalux 91756 from Nuplex, commercial, hydroxyl-containing polyacrylate having an OH number of 104 mgKOH/g, an acid number of 15 mgKOH/g, and a solids content (1 h 150° C.) of 65%, modified with a urea derivative based on benzylamine/hexamethylene diisocyanate
[4)]Commercial mixture of light stabilizer based on UV absorbers and light stabilizer based on HALS (sterically hindered amine), 6:4, from Ciba Speciality Chemicals Inc.
[5)]Commercial flow control agent from Lubrizol, based on a polyacrylate, amount based on pure active substance, i.e., amount without solvent
[6)]Commercial flow control agent from Byk Chemie GmbH, based on a modified polysiloxane, amount based on pure active substance, i.e., amount without solvent
[7)]Commercial flow control agent from Byk Chemie GmbH, based on a polyacrylate, 30% strength in methoxy-propyl acetate/butyl acetate 6:1
[8)]Commercial catalyst from Ciba, based on amine-blocked p-toluenesulfonic acid; 42% strength in ethylglycol
[9)]Commercial matting agent Acematt ® OK 412 from Degussa AG, based on silica with wax after-treatment, with an average particle size of 3 μm (determined by transmission electron microscopy), a d50 (determined by laser diffraction in a method based on ISO 13320-1) of 6.0 μm, and an oil number (method based on DIN EN ISO 787-5) of 220 g/100 g
[10)]Commercial matting agent Syloid ® ED 30 from W.R. Grace & Co. (=M1), Davison Chemical Division, described in table 1, based on silica gel with wax aftertreatment, having a wax content of 10% by weight, a measured average particle size (d50) of 5.6 μm, a pore volume (H$_2$O) of 1.8 ml/g, and an oil number of 300 g/100 g
[11)]Above-described paste of hydrophobic nanoparticles based on fumed silica (R1)

The sedimentation stability of the clearcoats of example 10 and of comparative examples C12 and C13 is determined by storing the clearcoats at room temperature and inspecting the binder mixtures for appearance of sediment after 1 week. If sediment appears, it ought to be possible to completely restore the mixture by reagitation within a period of not more than 1 hour, using a conventional laboratory mixer (more particularly Vollrath 370W, model "EWTHV 0,5" from Paul Vollrath GmbH & CO. KG, Hürth, rotation speed 800 revolutions per minute, Lenart disk d=90 mm) with a rotational speed of 800 revolutions per minute. The results are reported in table 10.

TABLE 10

Sedimentation stability of the clearcoats of inventive example 10 and of comparative examples C12 and C13

| Example | Matting agent | Reagitatability after 1 week |
|---|---|---|
| C12 | Acematt ® OK 412 | OK[1] |
| C13 | Syloid ® ED30 | OK[1] |
| 10 | Syloid ® ED30 + R1 | OK[1] |

Key to table 10:
[1]The visual assessment of the clearcoats of inventive example 10 and of comparative examples C12 and C13 showed greater settling of the clearcoat based on Acematt ® OK 412 of comparative example C12 than for the clearcoats based on Syloid ® ED30 of comparative example C13 and of example 10.

Furthermore, the circuit line stability of the clearcoats of example 10 and of comparative examples C12 and C13 was tested by pumping the clearcoats in a circuit line while subjecting them to a shearing load, the conditions being as follows:
Pressure at the return check valve: 10 bar
Reciprocating strokes per minute: 18
Volume (reciprocating stroke): 0.6 l Prior to the shearing load in the circuit line (TO=0), and after 500, 1500 and 2000 turnovers (TO) in the circuit line in each case, the 60° gloss of the coatings is measured. The circuit line stability of the coating compositions is sufficient when the gloss at an angle of 60°, after shearing by pumped circulation in a circuit line, is increased by not more than 10 gloss units. The gloss was measured in each case at 60° using a commercial gloss meter: Byk Gardner, micro-TR1-gloss, Cat. No. 4520 from Byk Gardner. The results are presented in table 11.

TABLE 11

Circuit line stability of the clearcoats of example 10 and of comparative examples C12 and C13

| Number of TO in circuit line | Comp. ex. C12 | Comp. ex. C13 | Example 10 |
|---|---|---|---|
| 0 | 27 | 30 | 29 |
| 500 | 29 | 30 | 29 |
| 1500 | 35 | 32 | 31 |
| 2000 | 43 | 32 | 32 |

In the case of the 1K clearcoats as well, the use of silica gel based matting agents, as in example 10 and in comparative example C13, produces an improved circuit line stability by comparison with clearcoats containing silica matting agents (comparative example C12).

Finally, for the 1K clearcoats as well, in the same way as for the testing of the 2K clearcoats, the operational window is assessed by investigating the gloss of the resultant coatings as a function of the preliminary drying of the basecoat. The results are presented in table 12.

TABLE 12

Relationship between gloss and preliminary drying of the basecoat

| Oven temperature [° C.] | Comp. ex. C12 | Comp. ex. C13 | Example 10 |
|---|---|---|---|
| 55 | 28 | 30 | 28 |
| 70 | 28 | 39 | 30 |
| 80 | 33 | 45 | 31 |
| 140 | 47 | 49 | 36 |

A comparison of inventive example E10 with comparative examples C12 and C13 in table 12 shows that the addition of the rheological assistant based on hydrophobically modified silica (R1) produces very little difference in the gloss of the resultant coating of example 10, even with extremely different preliminary drying of the basecoat, once at 55° C. and the other time at 140° C., and hence a very good operational window, whereas, without the use of the rheological assistant based on hydrophobically modified silica, the gloss of the resultant coating is actually very heavily dependent on the preliminary drying of the basecoat, both for comparative example C12 and for comparative example C13.

What is claimed is:

1. A clearcoat coating composition based on organic solvents and comprising: 30-70% by weight of at least one hydroxyl-containing compound (A); 20-50% by weight of at least one crosslinking agent (B) having groups reactive toward hydroxyl groups; 2-20% by weight of at least one silica gel based matting agent (M) comprising silica gel that is surface-modified with one or more waxes; and 0.01-3.0% by weight of at least one hydrophobic silica based rheological assistant (R); wherein the weight percents are based on the nonvolatile constituents of the coating composition, and wherein the at least one hydrophobic silica based rheological assistant (R) is prepared by surface modification of fumed silicon dioxide with compounds having hydrophobic groups, wherein, upon curing, the clearcoat coating composition is effective to not increase gloss, at an angle of 60°, by more than 10 gloss units after shearing by pumped circulation in a circuit line.

2. The clearcoat coating composition of claim 1, wherein the silica gel based matting agent (M) comprises an average particle size of 4 to 14 µm, determined by laser light scattering at room temperature on a dispersion of the particles in butyl acetate using a Malvern Mastersizer 2000 with the MSI mini-dispersing unit at 2000 revolutions per minute and with Fraunhofer evaluation.

3. The clearcoat coating composition of claim 1, wherein the silica gel based matting agent (M) has a pore volume of 1.2 to 2.5 ml/g.

4. The clearcoat coating composition of claim 1, wherein the hydrophobic silica based rheological assistant (R) has a primary particle size of 2 to 40 nm.

5. The clearcoat coating composition of claim 1, wherein the hydrophobic silica based rheological assistant (R) has a BET surface area of 35 to 350 m$^2$/g.

6. The clearcoat coating composition of claim 1, wherein the hydroxyl-containing compound (A) has an OH number of 80 to 250 mgKOH/g.

7. A method for improving circuit line stability of a matted clearcoat coating composition in an automotive OEM finishing or refinishing process, the method comprising:
a) forming a binder mixture by combining
i) 30%-70% by weight, based on the nonvolatile constituents of the coating composition, of at least one hydroxyl containing compound (A);

ii) 2%-20% by weight, based on the nonvolatile constituents of the coating composition, of at least one silica gel based matting agent (M) comprising silica gel that is surface-modified with one or more waxes, and;

iii) 0.01%-3.0% by weight, based on the nonvolatile constituents of the coating composition, of at least one hydrophobic silica based rheological assistant (R), wherein the at least one hydrophobic silica based rheological assistant (R) is prepared by surface modification of fumed silicon dioxide with compounds having hydrophobic groups;

b) adding to the binder mixture 20%-50% by weight, based on the nonvolatile constituents of the coating composition, of at least one crosslinking agent (B) having groups reactive toward hydroxyl groups; and c) stirring, thereby producing a matted clearcoat coating composition which, after shearing by pumped circulation in the circuit line, application to the automotive OEM finishing or refinishing substrate, and curing, does not increase in glossiness by more than 10 gloss units at an angle of 60°.

8. The method of claim 7, further comprising coating an optionally precoated substrate with a pigmented basecoat film and thereafter applying a film of the matted clearcoat coating composition of claim 1.

9. A The method of claim 8, wherein the substrate is selected from the group consisting of automotive OEM finishing substrates, substrates for utility vehicle finishing and/or refinishing, substrates for coating interior and/or exterior bodywork components, and mixtures of two or more of the foregoing.

10. The method of claim 7, further comprising applying the matted clearcoat coating composition in a multistage coating process in the OEM finishing or refinishing process.

11. The method of claim 7, further comprising applying the matted clearcoat coating composition by spraying, knife-coating, spreading, casting, dipping, impregnating, trickling or rolling in the OEM finishing or refinishing process.

12. The method of claim 7, wherein the matted clearcoat coating composition produced has improved sedimentation stability and an expanded operational window.

13. The method of claim 7, wherein the amount of the at least one hydroxyl containing compound (A) is 40%-60% by weight, based on the nonvolatile constituents of the coating composition.

14. The method of claim 7, wherein the amount of the at least one crosslinking agent (B) is 25%-45% by weight, based on the nonvolatile constituents of the coating composition.

15. The method of claim 7, wherein the least one crosslinking agent (B) is a polyisocyanates, and (B) is added to the binder mixture such that a ratio of isocyanate groups of (B) to hydroxyl groups of the hydroxyl-containing compounds (A) is between 0.7:1 and 1:1.3, between 0.8:1 and 1.2:1, or between 0.9:1 and 1.1:1.

16. The method of claim 7, wherein the at least one silica gel based matting agent (M) is dispersed with a portion of the at least one hydroxyl containing compound (A) to form a paste which is added to the remaining binder mixture.

17. The method of claim 7, wherein the at least one hydrophobic silica based rheological assistant (R) is dispersed with a portion of the at least one hydroxyl containing compound (A) to form a paste which is added to the remaining binder mixture.

18. The method of claim 7, wherein the at least one crosslinking agent (B) is combined with the at least one hydroxyl containing compound (A), the at least one silica gel based matting agent (M), and the at least one hydrophobic silica based rheological assistant (R) shortly before application of the matted clearcoat coating composition.

19. The method of claim 7, further comprising combining a carbamate group containing compound (E) with the binder mixture.

20. The method of claim 7, wherein the at least one silica gel based matting agent (M) is modified with one or more different, linear, unbranched polyolefin waxes.

\* \* \* \* \*